(12) United States Patent
Hirose

(10) Patent No.: US 8,266,978 B2
(45) Date of Patent: Sep. 18, 2012

(54) GEAR TRAIN ASSEMBLY AND IMAGE FORMING APPARATUS INCLUDING SAME

(75) Inventor: Yuichi Hirose, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 796 days.

(21) Appl. No.: 12/354,972

(22) Filed: Jan. 16, 2009

(65) Prior Publication Data

US 2009/0188338 A1 Jul. 30, 2009

(30) Foreign Application Priority Data

Jan. 30, 2008 (JP) ................. 2008-019625

(51) Int. Cl.
*F16H 57/04* (2010.01)
(52) U.S. Cl. ........................ 74/467; 184/6.12
(58) Field of Classification Search .............. 74/458, 74/467, 468; 184/6.12, 11.1; 399/75, 107, 399/167, 324
See application file for complete search history.

(56) References Cited

U.S. PATENT DOCUMENTS

| | | | | |
|---|---|---|---|---|
| 5,749,267 A | * | 5/1998 | Kock | 74/467 |
| 6,128,454 A | * | 10/2000 | Kawai et al. | 399/116 |
| 6,415,118 B1 | * | 7/2002 | Setoriyama et al. | 399/92 |

FOREIGN PATENT DOCUMENTS

| | | |
|---|---|---|
| JP | 5-141504 | 6/1993 |
| JP | 6-4446 U | 1/1994 |
| JP | 6-109104 | 4/1994 |
| JP | 11-38715 | 2/1999 |
| JP | 2006-345595 | 12/2006 |

OTHER PUBLICATIONS

Office Action issued Oct. 25, 2011 in Japanese Application No. 2008-019625.

* cited by examiner

*Primary Examiner* — Thomas R Hannon
*Assistant Examiner* — Phillip A Johnson
(74) *Attorney, Agent, or Firm* — Oblon, Spivak, McClelland, Maier & Neustadt, L.L.P.

(57) ABSTRACT

A gear train assembly includes a first gear, a second gear, a first lubricant receiver, and a second lubricant receiver. The first gear meshes with the second gear at an engagement portion. The first lubricant receiver is configured to catch lubricant from the first gear before the engagement portion. The second lubricant receiver is configured to catch lubricant from the first gear after the engagement portion. A minimum distance between the second lubricant receiver and the first gear is less than a minimum distance between the first lubricant receiver and the first gear. An image forming apparatus for forming an image includes the gear train assembly.

8 Claims, 6 Drawing Sheets

GEAR TRAIN ASSEMBLY AND IMAGE FORMING APPARATUS INCLUDING SAME

CROSS-REFERENCE TO RELATED APPLICATIONS

This patent application is based on and claims priority pursuant to 35 U.S.C. §119 from Japanese Patent Application No. 2008-019625 filed on Jan. 30, 2008 in the Japan Patent Office, the entire contents of which are hereby incorporated herein by reference.

BACKGROUND OF THE INVENTION

1. Field of the Invention

Exemplary aspects of the present invention generally relate to a gear train assembly and an image forming apparatus including the gear train assembly.

2. Description of the Background Art

Conventionally, there is known a gear train assembly employed in, but not limited to, an image forming apparatus, such as a copier or a printer, in which a distance between tips of the gear teeth and a surface that receives lubricant (hereinafter "lubricant receiver") is configured to be the same before and after the gear meshes with a mating gear. Such a gear train assembly is disclosed in JP-2006-345595-A, for example.

With reference to FIG. 1, a description is provided of a related art gear train assembly 160. FIG. 1 is a cross-sectional view of the related art gear train assembly 160 as viewed from along an axial shaft of the gear train assembly 160.

According to JP-2006-345595-A, the gear train assembly 160 includes a first gear 162, a second gear 164 that meshes with the first gear 162, and first and second lubricant receivers 166 and 168, respectively.

The first gear 162 rotates in a direction indicated by arrow F, that is, clockwise. Therefore, the first lubricant receiver 166 catches lubricant G before the first gear 162 meshes with the second gear 164, whereas the second lubricant receiver 168 catches the lubricant G after the first gear 162 meshes with the second gear 164.

According to the above-described related art technology, the lubricant G is applied to the first gear 162 and the second gear 164. Moreover, as indicated by arrow Y and arrow Z, a minimum distance between the first gear 162 and the first lubricant receiver 166 is substantially the same as the minimum distance between the first gear 162 and the second lubricant receiver 168.

As a result, with this configuration, the lubricant G accumulates on both the first lubricant receiver 166 as well as on the second lubricant receiver 168, thereby preventing the lubricant G from accumulating on only one surface. In other words, the lubricant G is dispersed substantially evenly over those surfaces that should be lubricated.

However, in order to accommodate increasing demand for high-speed and high-precision operation in an image forming apparatus, it is further desired that the gear train assembly employed in the image forming apparatus generate little vibration and noise while at the same time providing improved durability.

In view of the above, it is desired to evenly and thoroughly apply the lubricant G to the entire gear train and prevent the lubricant G applied to the gear surfaces from being scattered and exhausted.

It is to be noted that the minimum distance described above refers to the shortest distance between the tips of the teeth of the gear and the surface that catches the lubricant, that is, the lubricant receiver. When the lubricant receiver includes a protrusion, projection, or the like, the minimum distance then refers to the distance between the tips of the teeth of the gear and the tip of the protrusion, projection, or the like.

SUMMARY OF THE INVENTION

Illustrative embodiments of the present invention provide a gear train assembly in which lubricant is properly applied to gears, and an image forming apparatus including the gear train assembly.

The gear train assembly includes a first gear, a second gear, an engagement portion, a first lubricant receiver, and a second lubricant receiver. The first gear meshes with the second gear. The first gear and the second gear mesh at the engagement portion. The first lubricant receiver is configured to catch lubricant from the first gear before the engagement portion. The second lubricant receiver is configured to catch lubricant from the first gear after the engagement portion. A minimum distance between the second lubricant receiver and the first gear is less than a minimum distance between the first lubricant receiver and the first gear.

According to one preferred embodiment, an image forming apparatus for forming an image includes an image bearing member, a developing device, a transfer device, a fixing device, and the gear train assembly. The image bearing member is configured to bear an electrostatic latent image on a surface thereof. The developing device is configured to develop the electrostatic latent image formed on the image bearing member using toner to form a toner image. The transfer device is configured to transfer the toner image onto a recoding medium. The fixing device is configured to fix the toner image.

Additional features and advantages of the present invention will be more fully apparent from the following detailed description of illustrative embodiments, the accompanying drawings and the associated claims.

BRIEF DESCRIPTION OF THE DRAWINGS

A more complete appreciation of the disclosure and many of the attendant advantages thereof will be readily obtained as the same becomes better understood by reference to the following detailed description of illustrative embodiments when considered in connection with the accompanying drawings, wherein.

DETAILED DESCRIPTION OF ILLUSTRATIVE EMBODIMENTS

Figure 1:
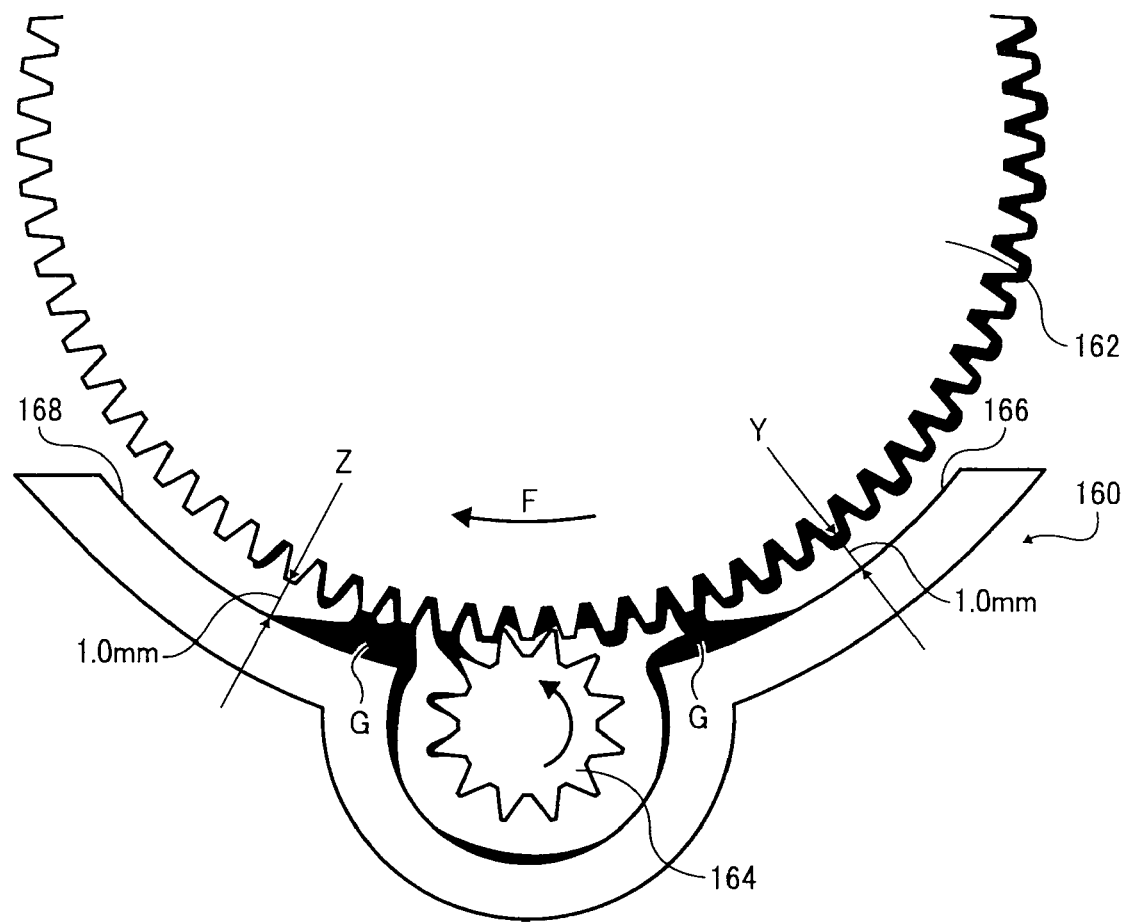
FIG. 1 is a cross sectional view of a related art gear train assembly as viewed from a shaft direction thereof.

In describing illustrative embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Illustrative embodiments of the present invention are now described below with reference to the accompanying drawings.

In a later-described comparative example, illustrative embodiment, and alternative example, for the sake of simplicity of drawings and descriptions, the same reference numerals will be given to constituent elements such as parts and materials having the same functions, and redundant descriptions thereof omitted.

Typically, but not necessarily, paper is the medium from which is made a sheet on which an image is to be formed. It should be noted, however, that other printable media are available in sheet form, and accordingly their use here is included. Thus, solely for simplicity, although this Detailed Description section refers to paper, sheets thereof, paper feeder, etc., it should be understood that the sheets, etc., are not limited only to paper, but includes other printable media as well.

Figure 2:
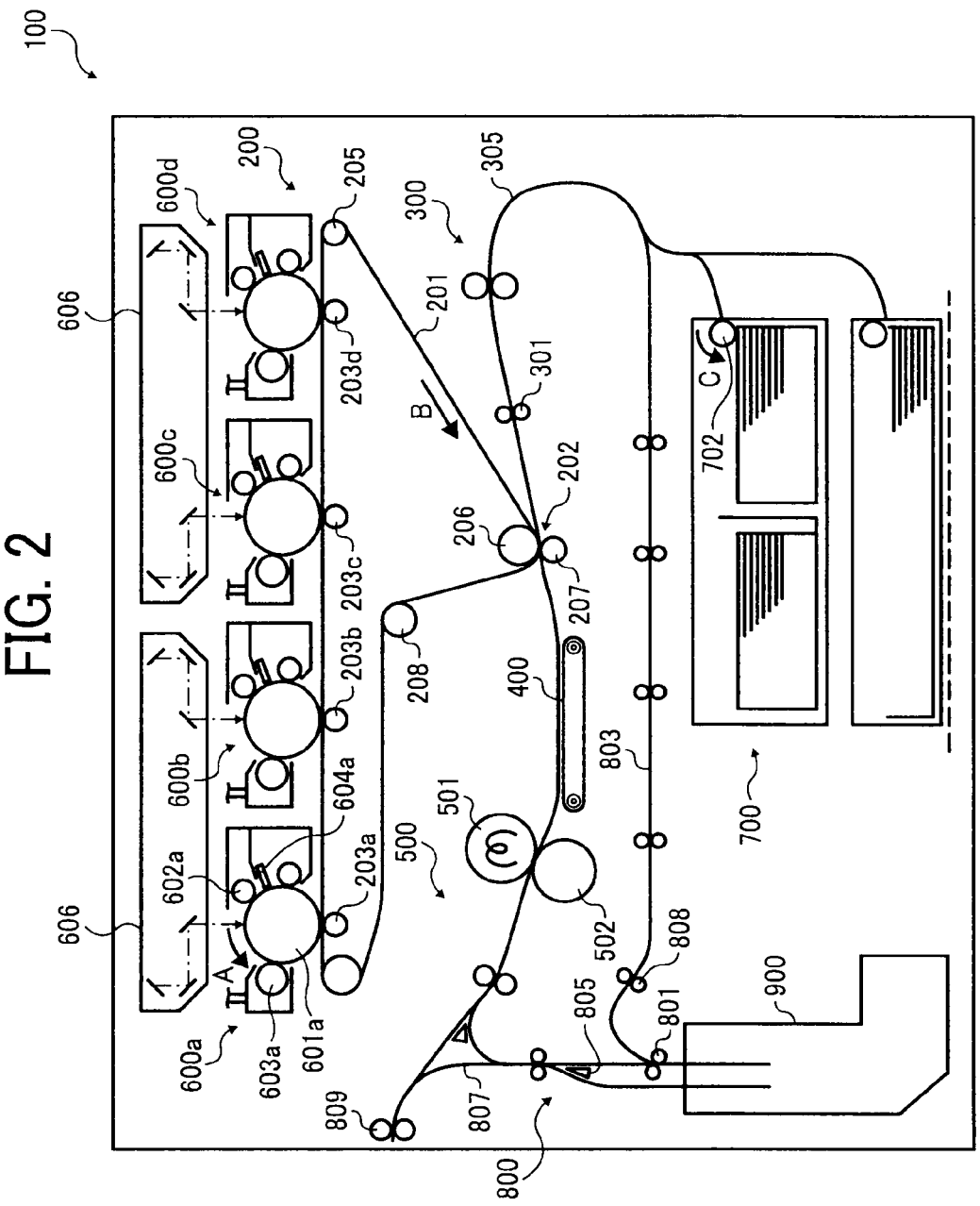
FIG. 2 is a schematic diagram illustrating an example of an image forming apparatus in which a gear train assembly according to an illustrative embodiment of the present invention is employed.

Referring now to the drawings, wherein like reference numerals designate identical or corresponding parts throughout the several views, and initially to FIG. 2, one example of an image forming apparatus equipped with a gear train assembly according to an illustrative embodiment of the present invention is described.

Referring now to FIG. 2, there is provided a schematic diagram illustrating a printer as an example of the image forming apparatus in which the gear train assembly according to the illustrative embodiment is employed.

As illustrated in FIG. 2, the image forming apparatus 100 includes an intermediate transfer unit 200, image forming stations 600a, 600b, 600c, and 600d, a sheet transport unit 300, and a fixing unit 500.

The intermediate transfer unit 200 includes an intermediate transfer belt 201 and an image transfer portion 202. At the image transfer portion 202, an image is transferred onto a recording sheet.

The image forming stations 600a, 600b, 600c, and 600d correspond to colors of yellow, magenta, cyan, and black, respectively, and are disposed facing the intermediate transfer belt 201 of the intermediate transfer unit 200. The sheet transport unit 300 is disposed at substantially the bottom right of the intermediate transfer unit 200.

The sheet transport unit 300 includes a sheet transport device 400. The sheet transport device 400 is disposed between the image transfer portion 202 of an intermediate transfer unit 200 and the fixing unit 500 that fixes the image on the recording sheet.

As illustrated in FIG. 2, the image forming station 600a is dedicated to yellow. The image forming station 600a includes a photoreceptor drum 601a, a charging device 602a, a developing device 603a, a cleaning device 604a, and a charge neutralization device, not illustrated.

The charging device 602a, the developing device 603a, the cleaning device 604a, and the charge neutralization device are disposed around the photoreceptor drum 601a.

In the image forming station 600a, an image in yellow is formed on the photoreceptor drum 601a serving as an image bearing member.

It is to be noted that the image forming stations 600a, 600b, 600c, and 600d all have the same configuration as all the others, differing only in the color of toner employed. The image forming stations 600a, 600b, 600c, and 600d form images corresponding to the respective color of toner. Therefore, a detailed description of the image forming stations 600b, 600c, and 600d is omitted herein. Instead, a description will be provided of the image forming station 600a dedicated to color yellow.

With reference to FIG. 2, a description is provided of an image forming process employed in the image forming apparatus 100.

The photoreceptor drum 601a is rotated by a drive motor, not illustrated, in a direction indicated by arrow A in FIG. 2. The surface of the photoreceptor drum 601a is evenly charged by a charging unit 602a and arrives at a position at which a laser beam L irradiated from an exposure unit 606 exposes the surface of the photoreceptor drum 601a. Accordingly, an electrostatic latent image corresponding to yellow is formed on the photoreceptor drum 601a.

Subsequently, the surface of the photoreceptor drum 601a arrives opposite a developing unit 603a that develops the electrostatic latent image on the surface of the photoreceptor drum 601a into a toner image, that is, a visible image in yellow.

Subsequently, the surface of the photoreceptor drum 601a arrives opposite the intermediate transfer belt 201 and a transfer roller 203a. The toner image on the surface of the photoreceptor drum 601a is primarily transferred onto the intermediate transfer belt 201. This process is a so-called primary transfer process.

A slight amount of toner that has not been transferred remains on the surface of the photoreceptor drum 601a. When the surface of the photoreceptor drum 601a arrives opposite the cleaning device 604a equipped with a cleaning blade, the cleaning blade removes the residual toner from the surface of the photoreceptor drum 601a and recovers the residual toner to the cleaning device 604a.

Lastly, the surface of the photoreceptor drum 601a arrives opposite a charge neutralize device, not illustrated, that removes residual potential from the surface of the photoreceptor drum 601a in preparation for the subsequent imaging cycle.

The foregoing description pertains to the image forming process of the image forming station 600a. The same image forming process as that of the image forming station 600a is performed in the image forming stations 600b, 600c, and 600d, except for the color of the toner employed.

In other words, the laser beams L emitted from the exposure units 606 disposed substantially above the image forming stations 600a, 600b, 600c, and 600d illuminate the photoreceptor drums 601a, 601b, 601c, and 601d of the image forming stations 600a, 600b, 600c, and 600d, respectively, based on image information.

It is to be noted that in FIG. 2 the image forming apparatus 100 includes two exposure units 606 that have the same function. Thus, the description is provided of one of the exposure units 606.

In particular, an light source of the exposure unit 606 emits the laser beam L. The laser beam L is scanned and reflected by a polygon mirror that rotates, and illuminates the photoreceptor drums 601b, 601c, 601d of the image forming stations 600b, 600c, and 600d through a plurality of optical elements.

Subsequently, on the intermediate transfer belt 201, toner images of each color formed on the respective photoreceptor drums 601a, 601b, 601c, and 601d are overlappingly transferred onto the intermediate transfer belt 201 after development. Accordingly, a composite color image is formed on the intermediate transfer belt 201 of the intermediate transfer unit 200.

The intermediate transfer unit 200 includes four intermediate transfer rollers 203a, 203b, 203c, and 203d; a drive roller 205; the intermediate transfer belt 201 driven by the drive roller 205; a secondary transfer roller 206 disposed in an inner loop of the intermediate transfer belt 201; an opposing roller 207 disposed opposite the intermediate transfer belt 201; a driven roller 208; and so forth.

The intermediate transfer belt 201 is wound around and stretched by the plurality of rollers. Further, as the drive roller 205 rotates, the intermediate transfer belt 201 travels endlessly in a direction indicated by arrow B in FIG. 2.

The intermediate transfer belt 201 is sandwiched between the intermediate transfer rollers 203a, 203b, 203c, and 203d, and the photoreceptor drums 601a, 601b, 601c, and 601d. Between each of the intermediate transfer rollers 203a, 203b, 203c, and 203d, and the photoreceptor drums 601a, 601b, 601c, and 601d, a primary transfer portion, a so-called a primary transfer nip is formed.

Then, a transfer voltage that is an opposite polarity than that of toner is applied to the transfer rollers 203a, 203b, 203c, and 203d.

As described above, the intermediate transfer belt 201 travels in the direction of arrow B and sequentially passes the transfer rollers 203a, 203b, 203c, and 203d, as well as the primary transfer nips. As the intermediate transfer belt 201 travels, the toner images of each color are primarily transferred from the photoreceptor drums 601a, 601b, 601c, and 601d onto the intermediate transfer belt 201.

Subsequently, the intermediate transfer belt 201, onto which the toner images are overlappingly transferred, arrives at the image transfer portion 202 at which the intermediate transfer belt 201 is sandwiched between the secondary transfer roller 206 and the opposing roller 207.

At the image transfer portion 202, the four-color composite toner image formed on the intermediate transfer belt 201 is secondarily transferred onto a recording medium, such as a paper sheet, or the like, that has been transported to the secondary transfer portion 202.

After the secondary transfer, the residual toner, not having been transferred onto the recording medium, remains on the intermediate transfer belt 201. The surface of the intermediate transfer belt 201 arrives at a cleaning portion, not-illustrated, at which the residual toner is removed from the intermediate transfer belt 201 in preparation for the subsequent imaging cycle.

Next, with reference to FIG. 2, a description is provided of an example of sheet transport process.

The image forming apparatus 100 includes a sheet transport unit 700 including a sheet feed roller 702, disposed substantially at the bottom of the image forming apparatus 100. In the sheet transport unit 700, the sheet feed roller 702 picks up the recording medium. The recording medium is then transported to the image transfer portion 202 via the sheet transport unit 300.

The recording medium passes through the sheet transport device 400, the fixing unit 500, and a sheet reverse unit 800. The recording medium is discharged outside the image forming apparatus 100 by a sheet discharge roller 809.

In the sheet feed unit 700, a stack of recording media sheets is stored. When the sheet feed roller 702 of the sheet feed unit 700 rotates in the counterclockwise direction indicated by arrow C in FIG. 2, the sheet feed roller 702 picks up and feeds the top sheet.

The sheet feed unit 700 according to the illustrative embodiment is disposed substantially at the bottom of the image forming apparatus 100. However, the location of the sheet feed unit 700 is not limited to this. Alternatively, the Sheet feed unit 700 can be provided as a Large Capacity Tray (LCT) that also stores the plurality of the recording sheets substantially at the side of the image forming apparatus 100.

In the sheet transport unit 300, after receiving the recording sheet from the sheet feed unit 700, the position of the recording sheet is corrected using a sheet transport roller, not illustrated. The position of the recording sheet is corrected, for example, in the sheet transport direction (vertical registration correction), in the width direction (horizontal registration correction), and in an oblique direction.

Subsequently, the sheet transport unit 300 transports the recording sheet to the image transfer portion 202 using a pair of registration rollers 301 in an appropriate timing such that the recording sheet is aligned with the composite color image on the intermediate transfer belt 201. Accordingly, a desired color image is transferred onto the recording sheet.

The sheet transport device 400 of the sheet transport unit 300 receives the recording sheet from the image transfer portion 202 and then transports the recording sheet to the fixing unit 500. The sheet transport device 400 transports the recording sheet by suctioning the recording sheet using a fan, not illustrated. The sheet transport device 400 includes also a sheet transport belt, described later, that is rotated by a driving device, not illustrated.

The fixing unit 500 includes a fixing roller 501 and a pressure roller 502. In the fixing unit 500, after receiving the recording sheet from the sheet transport device 400, the fixing roller 501 and the pressure roller 502 apply heat and pressure to fix the image transferred onto the recording sheet.

Subsequently, the sheet reverse unit 800 receives the recording sheet from the fixing unit 500. The sheet reverse unit 800 includes a sheet reverse roller 801, a switching device 805, a reverse-discharge path 807, a sheet transport roller 808, and a discharge roller 809. After receiving the recording sheet, the sheet reverse unit 800 reverses the recording sheet depending on single-sided print job or double-sided print job.

The sheet reverse roller 801 reverses and transports the recording sheet again to the image transfer portion 202. The reverse roller 801 is also configured to reverse and discharge the recording sheet outside the image forming apparatus 100. Accordingly, the recording medium is reversed and discharged through the sheet discharge path 807.

In a case in which the image is formed on both sides thereof, that is, double-sided printing is instructed, the sheet transport roller 808 transports the recording sheet again.

Subsequently, the recording sheet is discharged outside the image forming apparatus 100 by the sheet discharge roller 809. The recording sheet, on which the image is printed, is discharged onto a discharge tray, not illustrated. Accordingly, the image forming cycle from feeding the recording sheet to discharging the recording sheet is finished.

In a case in which an image is formed only one side of the recording sheet, the sheet reverse unit 800 turns the recording sheet face down.

By contrast, in a case where images are formed on both sides of the recording sheet, the sheet reverse unit 800 turns the recording sheet by using the sheet reverse roller 801. Subsequently, the recording sheet passes a sheet re-feed path 803 so that the recording sheet is fed to the image transfer portion 202 again.

Furthermore, when images are formed on both sides of the recording sheet, the recording sheet is discharged by the sheet discharge roller 809 without passing through the sheet reverse roller 801.

Figure 3:
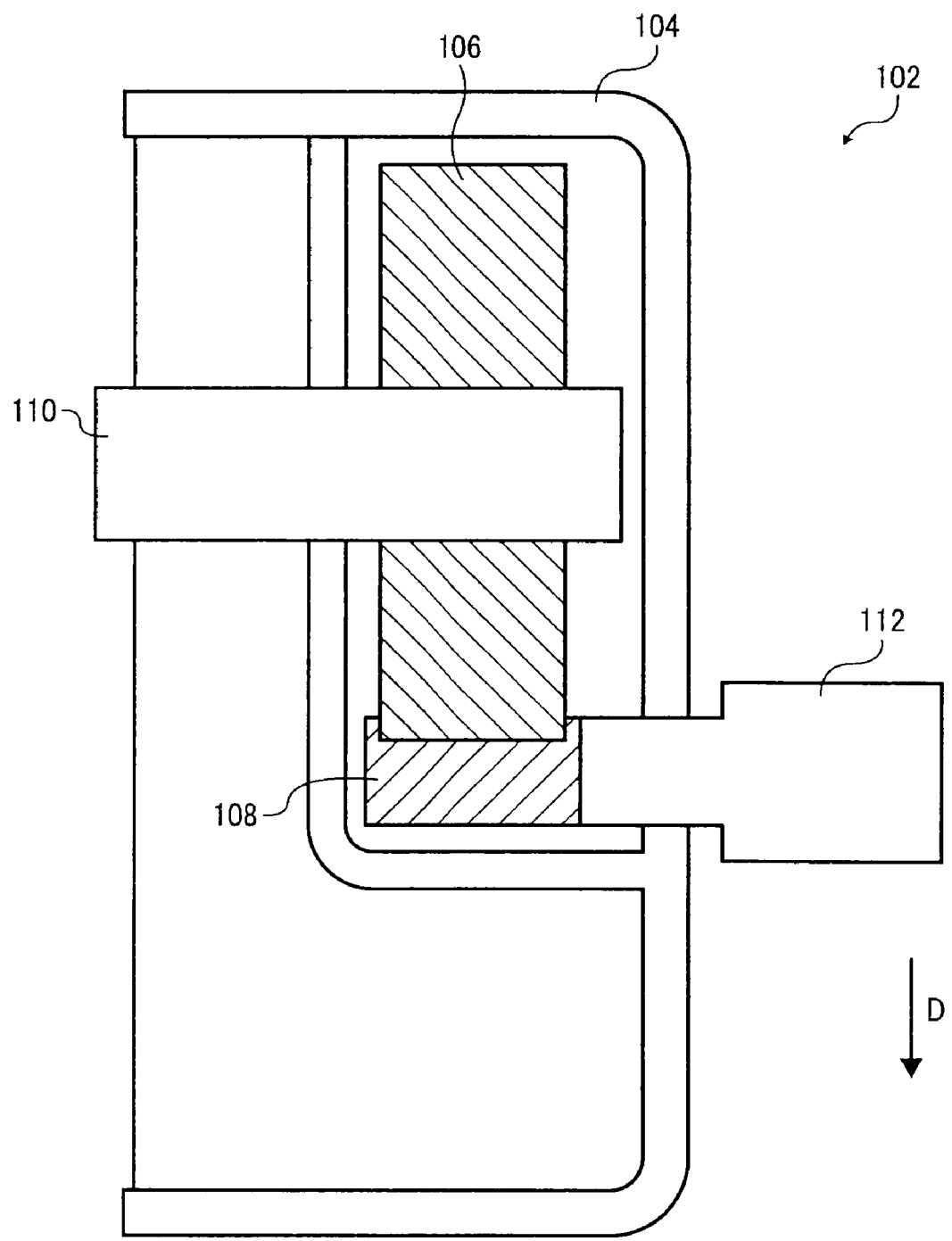
FIG. 3 is a cross-sectional view of a gear train assembly according to an illustrative embodiment of the present invention.

Referring now to FIG. 3, there is provided a horizontal cross-sectional view of a gear train assembly 102 that is employed in the intermediate transfer unit 200 according to the illustrative embodiment.

The gear train assembly 102 includes a housing 104, a first gear 106, a second gear 108, a shaft 110, and so forth. In the housing 104 of the gear train assembly 102, the first gear 106 and the second gear 108 are provided so as to mesh. The first gear 106 is connected to the shaft 110 that is connected to the intermediate transfer unit 200, although not illustrated in FIG. 3. One end of the second gear 108 is connected to a stepping motor 112.

The stepping motor 112 causes the gear train assembly 102 to drive the intermediate transfer unit 200. When the stepping motor 112 rotates, its driving force is transmitted to the second gear 108.

Furthermore, the driving force is transmitted to the first gear 106 that meshes with the second gear 108 so that the driving force is, then, transmitted to the intermediate transfer unit 200 through the shaft 110 connected to the first gear 106.

According to the illustrative embodiment, unless otherwise specified, the gears are helical gears having involute teeth. When the gear is a helical gear, the contact point of the gears shifts in the direction of a tooth trace from the beginning to the end of meshing of the gear teeth. Consequently, lubricant accumulates substantially at the bottom of the gear and is pushed to the front end of the shaft of the second gear 108, as the contact point shifts in the direction of the tooth trace.

As a result, when at least a certain amount of the lubricant is applied, the lubricant can be spread in the direction of the tooth trace, thereby reducing irregular application of the lubricant at the beginning of application of the lubricant, as the gears mesh.

According to the illustrative embodiment, the gear train assembly 102 is operated such that gravity acts on the gear train assembly 102 in a direction indicated by arrow D in FIG. 3.

In the gear train assembly 102, in order to prevent abrasion between the first gear 106 and the second gear 108, and/or to reduce vibration and noise when the first gear 106 and the second gear 108 mesh, the lubricant is applied to the tips of the gear teeth of the first gear 106 in advance.

According to the illustrative embodiment, the lubricant includes Moly Hi-temp grease manufactured by SUMICO LUBRICANT CO., LTD. The moly high-temp grease uses benton as a puffing agent and also uses molybdenum disulfide•MCA as an additive.

The color of Moly Hi-temp grease is substantially grayish black. The base material or oil thereof includes ester synthetic oil. The ratio thereof is approximately 1.02. The density is approximately 1.02 g per $cm^3$ at 20 degrees C. The worked penetration level is approximately 322. A separation degree is approximately 0.55%. An operating temperature is approximately between −15 and 250 degree C. A kinematic viscosity of the base oil is approximately 320 $mm^2$/s at 40 degrees C. and 20 $mm^2$/s at 100 degrees C.

Figure 4:
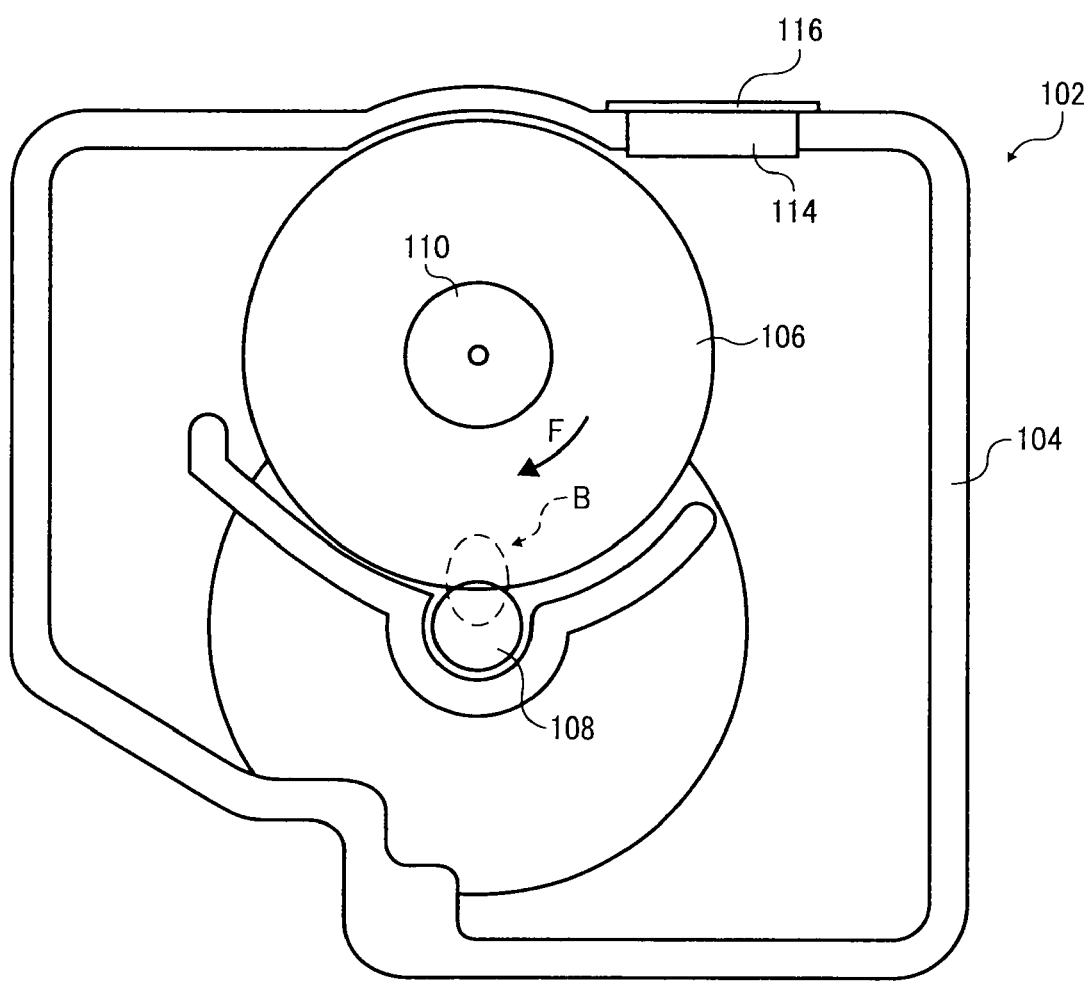
FIG. 4 is a cross-sectional view of the gear train assembly of FIG. 3 as viewed from a shaft direction thereof according to an illustrative embodiment of the present invention.

Referring now to FIG. 4, there is provided a cross-sectional view of the gear train assembly 102 as viewed along the shaft thereof, according to the illustrative embodiment.

In FIG. 4, in the gear train assembly 102, the first gear 106 is driven in a direction indicated by arrow F, that is, clockwise. As illustrated in FIG. 4, the housing 104 of the gear train assembly 102 also includes an inlet 114 and a lid 116 for the inlet 114. The lubricant is supplied from the inlet 114. The lid 116 covers the inlet 114 so as to prevent foreign substances such as powder dust from getting inside.

When maintenance personnel perform maintenance on the gear train assembly 102, he or she opens the inlet 114 of the housing 104 and thoroughly applies the lubricant to the entire surface of gear teeth of the first gear 106.

A reference character B in FIG. 4 refers to an engagement portion where the first gear 106 and the second gear 108 mesh.

The area before where the first gear 106 and the second gear 108 mesh, that is, the area anterior to engagement portion B, is substantially on the right side in FIG. 4, whereas the area after where the first gear 106 and the second gear 108 mesh, that is, posterior to the engagement portion B, is substantially on the left side in FIG. 4.

Figure 5:
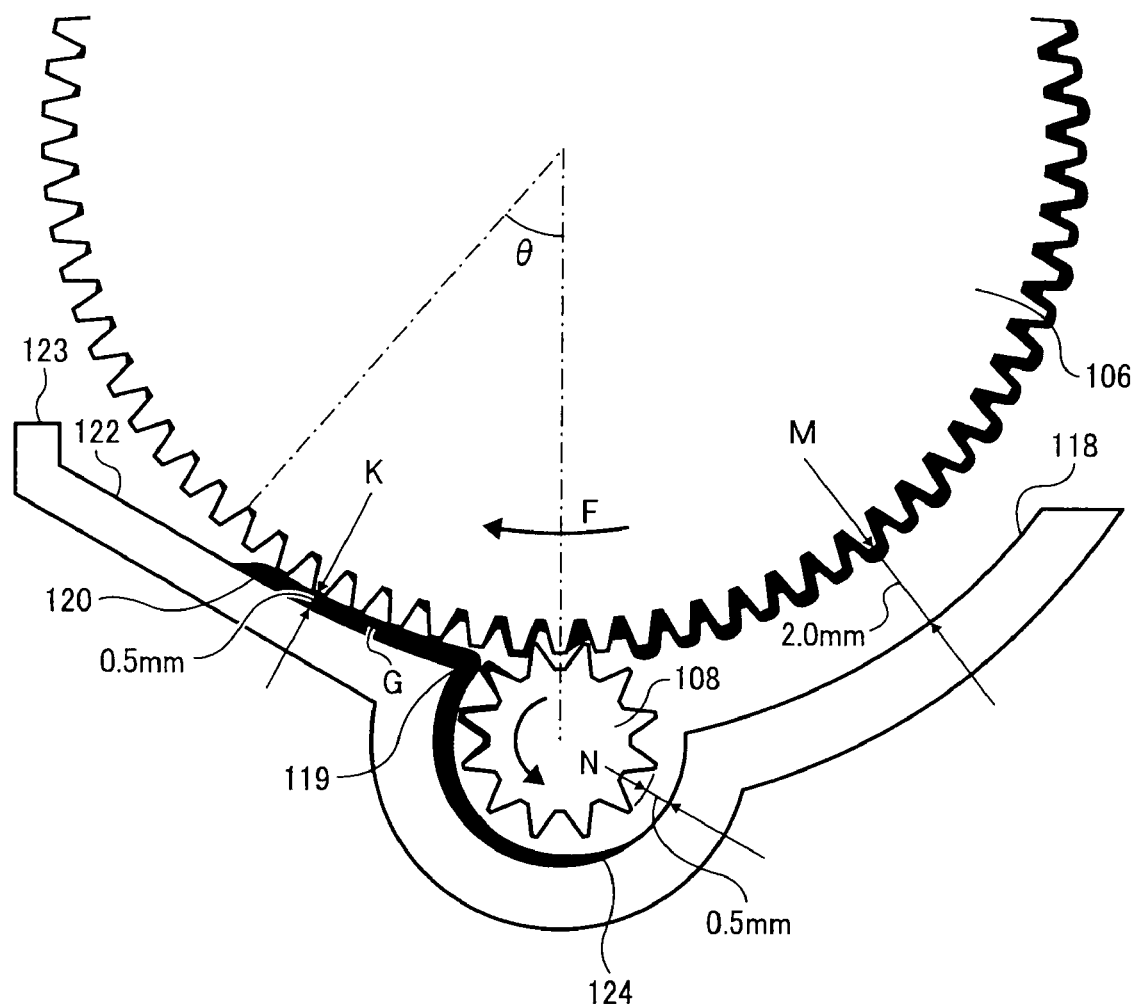
FIG. 5 is a partially enlarged cross-sectional view of the gear train assembly when lubricant G is applied according to an illustrative embodiment of the present invention.

Referring now to FIG. 5, there is provided a partially enlarged cross-sectional view of the engagement portion B of the gear train assembly 102 according to a first illustrative embodiment.

With reference to FIG. 5, a sequence of application of the lubricant, hereinafter referred to as lubricant G, according to the first illustrative embodiment is described.

As illustrated in FIG. 5, the lubricant G is applied from the inlet 114 of the housing 104, not illustrated in FIG. 5, to substantially the bases as well as the tips of the gear teeth of the first gear 106.

Substantially before the engagement portion B, a first lubricant receiver 118, that is a surface that receives the lubricant G before the engagement portion B, is provided. Substantially after the engagement portion B, a second lubricant receiver 120, that is a surface that receives the lubricant G after the engagement portion B, and a lubricant recovery portion 119, described later, are provided.

A portion of the first lubricant receiver 118 is formed substantially in the shape of an arc of a circle, the center of which substantially coincides with the center of rotation of the first gear 106, that is, is concentric with the first gear 106.

The lubricant G is applied to the second gear 108 at the engagement portion B such that the lubricant G accumulated substantially at the bottoms of the gear teeth of the first gear 106 and spread on the tips of the first gear 106 is spread over the space between the first gear 106 and the second gear 108, by which action the lubricant G is applied to the second gear 108.

Furthermore, as the first gear 106 and the second gear 108 continue to rotate, the lubricant G is spread over the surface of the gear teeth of the first gear 106 and is drawn from the tips of the gear teeth thereof to the second gear 108 due to the driving force of the second gear 108. As a result, after engagement, the lubricant G is spread on the first gear 106 as well as the tips of the second gear 108.

In addition, when the first gear 106 and the second gear 108 rotate, generating centrifugal force, the centrifugal force acts on the lubricant G to disperse the lubricant G radially.

As described above, the lubricant recovery portion 119 is provided substantially posterior to the engagement portion B, in the vicinity of the tips of the gear tooth of the first gear 106. The lubricant recovery portion 119 is configured to scrape off the lubricant G spread on the tips of the gear teeth of the first gear 106.

According to the illustrative embodiment, the lubricant G spread on the tips of the gear teeth of the first gear 106 is scraped off from the tip thereof such that, in addition to the centrifugal force of the first gear 106, when the lubricant G on the tips of the gear teeth of the first gear 106 contacts the lubricant G accumulated at the lubricant recovery portion 119, the viscosity of the lubricant G accumulated at the lubricant recovery portion 119 separates the lubricant G on the tips of the gear teeth of the first gear 106 from the tips of the gear teeth of the first gear 106 as the first gear 106 rotates, spreading the lubricant G over the second lubricant receiver 120.

Except for the lubricant recovery portion 119 and the second lubricant receiver 120, everywhere else only the centrifugal force produced with the rotation of the first gear 106 acts on the lubricant G adhering to the first gear 106.

However, the viscosity of the lubricant G that causes the lubricant G to remain adhered to the first gear 106 is greater than the centrifugal force. Consequently, the lubricant G remains adhered to the first gear 106.

By contrast, at the lubricant recovery portion 119 and on the second lubricant receiver 120, in addition to the centrifugal force, the viscosity of the lubricant G at the lubricant recovery portion 119 and engagement with the second gear 108 allow the lubricant G to be removed.

When the second lubricant receiver 120 receives the lubricant G, gravity acts on the lubricant G, and thus the lubricant G is scooped by the tips of the gear teeth of the first gear 106 again on the second lubricant receiver 120. Accordingly, the lubricant G adheres again to the first gear 106. This is a lubrication cycle of the lubricant G.

The second lubricant receiver 120 is formed substantially in the shape of an arc of a circle that is substantially concentric with the first gear 106, so that the distance between the second lubricant receiver 120 and the tooth-tip circle of the first gear 106 can be kept constant.

With this configuration, the lubricant G can be received in the form of a film, thereby necessitating only a small amount of the lubricant G be used during the lubrication cycle.

Furthermore, when maintenance personnel apply the lubricant G, even if the lubricant G is not evenly applied to the first gear 106, the lubricant G can still be applied relatively evenly after engagement with the second gear 108.

According to the illustrative embodiment, the arc is formed between the lubricant recovery portion 119 and a place with approximately a 40-degree angle (θ=approximately 40°) from a point vertically below the first gear 106 in the rotation direction indicated by arrow F.

Furthermore, according to the illustrative embodiment, as illustrated in FIG. 5, a support portion 122 is continuously formed with the second lubricant receiver 120.

The support portion 122 is configured such that, when the first gear 106 separates from the second lubricant receiver 120 that is the arc-shaped portion along the tooth-tip circle of the first gear 106, the distance between the tips of the gear teeth of the first gear 106 and the support portion 122 increases as the tips of the gear teeth of the first gear 106 separate from the engagement portion B, that is, as the first gear 106 rotates.

Furthermore, the second lubricant receiver 120 is continuously formed with the support portion 122 and a lubricant stopper 123. As illustrated in FIG. 5, the lubricant stopper 123 projects substantially vertically.

According to the illustrative embodiment, when the lubricant stopper 123 is provided, the lubricant G is prevented from being dispersed from the first gear 106, thereby also preventing the lubricant G from being spilled outside the housing 104.

According to the illustrative embodiment, a minimum distance K or a clearance between the first gear 106 and the second lubricant receiver 120 is configured to be approximately 0.5 mm. This is because a module of the gear defined by the first gear 106 is 0.5.

Further, the minimum distance K or the clearance between the first gear 106 and the second lubricant receiver 120 is configured to be less than the minimum distance or a clearance between the first gear 106 and the first lubricant receiver 118. When the clearance is thus properly configured, the lubricant G adhering to the tips of the gear teeth can be accumulated on the second lubricant receiver 120.

It is to be noted that, by contrast, when the Moly Hi-temp grease was used as the lubricant G and the minimum distance or the clearance between the first gear 106 and the second lubricant receiver 120 was twice as much as the module of the gear, in that case, 1.0 mm, the lubricant G was not removed from the second lubricant receiver 120. Furthermore, the first gear 106 was not able to scoop the lubricant G. Consequently, a desirable lubrication cycle was not achieved.

In view of the above, it is desirable that the clearance between the second lubricant receiver 120 and the tooth-tip circle of the first gear 106 be equal to or less than a value twice as much as the module.

Still further, according to the illustrative embodiment, as illustrated in FIG. 5, the gear train assembly 102 includes the first lubricant receiver 118 and a third lubricant receiver 124. The first lubricant receiver 118 is formed along the tooth-tip circle of the first gear 106. In other words, the first lubricant receiver 118 is formed substantially in the shape of arc, substantially concentric with the first gear 106.

The third lubricant receiver 124 is formed along a tooth-tip circle of the second gear 108. In other words, the third lubricant receiver 124 is formed substantially in the shape of arc, substantially concentric with the second gear 108.

The first lubricant receiver 118, the second lubricant receiver 120, and the third lubricant receiver 124 are continuously formed along the direction of rotation of the first gear 106 indicated by arrow F.

With this configuration, the first gear 106 and the second gear 108 are substantially encapsulated by the first lubricant receiver 118, the second lubricant receiver 120, and the third lubricant receiver 124, thereby preventing the lubricant G from being spilled during lubrication.

According to the illustrative embodiment, a minimum distance M between the first lubricant receiver 118 and the first gear 106 is configured to be approximately 2.0 mm, for example.

With this configuration, when operation is halted, due to gravity, the first lubricant receiver 118 catches the lubricant G, and then supplies the lubricant G to the third lubricant receiver 124.

Furthermore, when the first lubricant receiver 118 is substantially arc-shaped, the minimum distance provided between the tooth-tip circle of the first gear 106 and the first lubricant receiver 118 can be substantially constant, so that the first lubricant receiver 118 can catch evenly the lubricant G.

Further, according to the illustrative embodiment, since the minimum distance is configured to be greater than the module of the first gear 106, the lubricant G is prevented from being scraped off and adhering again before the first gear 106 and the second gear 108 mesh. Due to the combined effects of centrifugal force as well as gravity, the first lubricant receiver 118 is able to catch the lubricant G that is dispersed before the first gear 106 and the second gear 108 mesh.

According to the illustrative embodiment, the third lubricant receiver 124 is configured such that the minimum distance between the third lubricant receiver 124 and the second gear 108 indicated by arrow N is substantially the same distance as that between the first gear 106 and the second lubricant receiver 120 indicated by arrow K.

Consequently, the third lubricant receiver 124 can catch the lubricant dispersed from the tips of the gear teeth of the second gear 108 due to the centrifugal force generated by rotation of the second gear 108 and collect also the lubricant G from the first lubricant receiver 118 and the second lubricant receiver 120 due to gravity.

Furthermore, when a certain amount of the lubricant G is accumulated on the third lubricant receiver 124, the lubricant G accumulated near the tips of the gear teeth of the second gear 108 can be re-adhered to the second gear 108, thereby enabling the lubricant G to be recycled.

Figure 6:
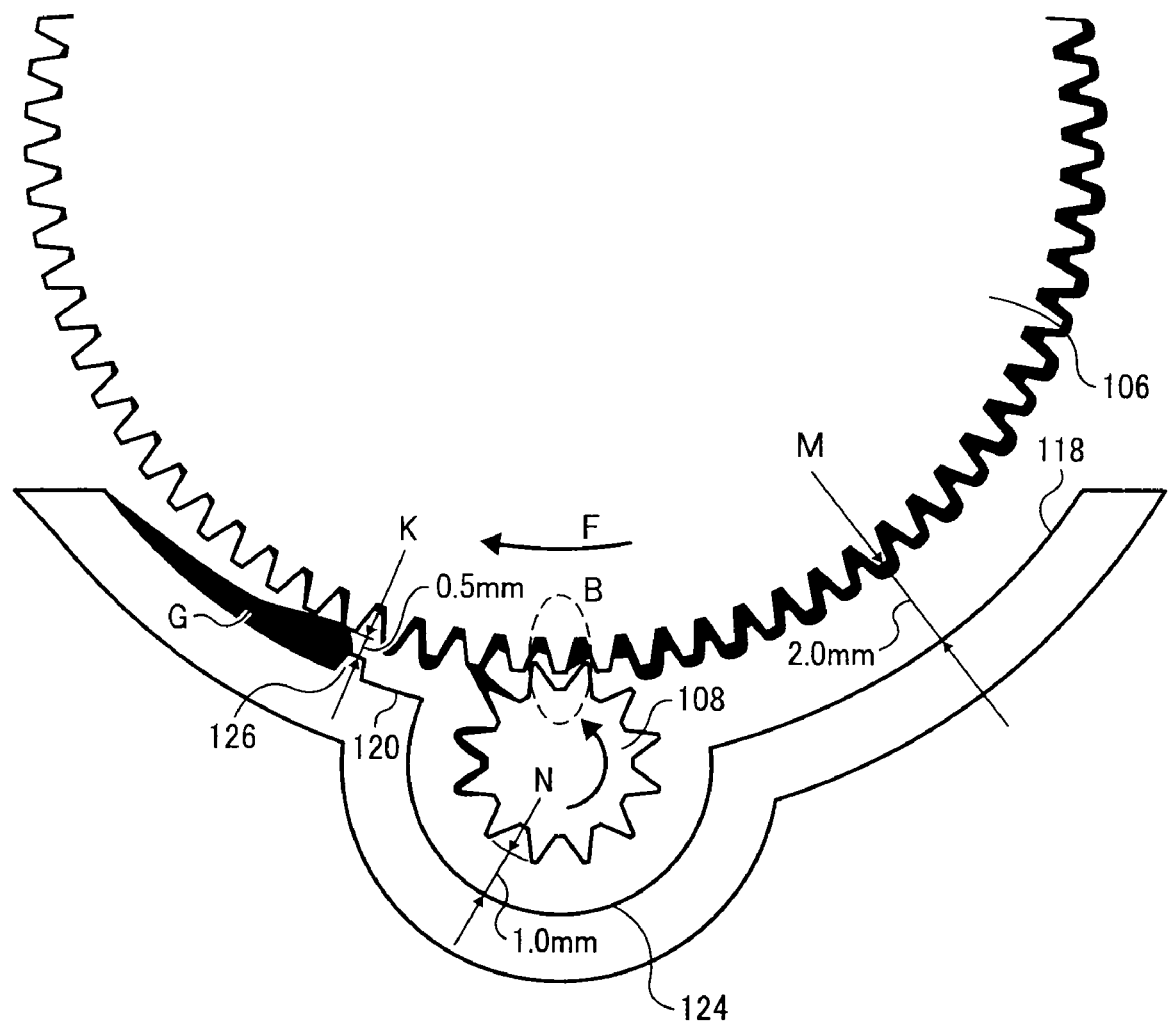
FIG. 6 is a partially enlarged cross-sectional view of the gear train assembly when lubricant G is applied according to another illustrative embodiment of the present invention.

Referring now to FIG. 6, there is provided a partially enlarged cross-sectional view of the engagement portion B of the gear train assembly 102 according to another illustrative embodiment. With reference to FIG. 6, a sequence of application of the lubricant G is described.

What is different from the first illustrative embodiment illustrated in FIG. 5 is that a projection 126 is provided to the second lubricant receiver 120.

When the projection 126 is provided on the second lubricant receiver 120, after the first gear 106 and the second gear 108 mesh, the lubricant G at the tips of the gear teeth of the first gear 106 is removed by the projection 126, and then the lubricant G is accumulated substantially at an upper side of the second lubricant receiver 120.

With this configuration, the lubricant G is prevented from flowing onto the third lubricant receiver 124.

As illustrated in FIG. 6, according to the illustrative embodiment, the minimum distance M or the clearance between the first lubricant receiver 118 and the first gear 106 is configured to be approximately 2.0 mm. The minimum distance K or the clearance between the tip surface of the projection 126 of the second lubricant receiver 120 and the first gear 106 is configured to be approximately 0.5 mm.

It is to be noted that the minimum distance or the clearance between the place on the second lubricant receiver 120 without the projection 126 and the first gear 106 is configured to be approximately 1.0 mm.

The minimum distance N or the clearance between the third lubricant receiver 124 and the second gear 108 is configured to be approximately 1.0 mm.

It is to be noted that the present invention is not limited to the above-described embodiments.

According to the illustrative embodiment, the projection 126 that scrapes off the lubricant G from the first gear 106 is provided substantially at the upper side of the second lubricant receiver 120.

With this configuration, the first gear 106 and the second gear 108 can be lubricated substantially anterior to, that is, in front of, the projection 126. In other words, lubrication cycle can be performed before the projection 126.

It is to be noted that the foregoing description pertains to the gear train assembly 102 that is employed in the intermediate transfer unit 200. However, the present invention is not limited to these embodiments described above. For example, the present invention can be applied to a driving device for a photoreceptor, a developing roller, a fixing roller, and so forth that need to operate under stress for an extended time period.

Furthermore, it is to be understood that elements and/or features of different illustrative embodiments may be combined with each other and/or substituted for each other within the scope of this disclosure and appended claims. In addition, the number of constituent elements, locations, shapes and so forth of the constituent elements are not limited to any of the structure for performing the methodology illustrated in the drawings.

Still further, any one of the above-described and other exemplary features of the present invention may be embodied in the form of an apparatus, method, or system.

For example, any of the aforementioned methods may be embodied in the form of a system or device, including, but not limited to, any of the structure for performing the methodology illustrated in the drawings.

Example embodiments being thus described, it will be obvious that the same may be varied in many ways. Such exemplary variations are not to be regarded as a departure from the scope of the present invention, and all such modifications as would be obvious to one skilled in the art are intended to be included within the scope of the following claims.

What is claimed is:

1. A gear train assembly, comprising:
    a first gear having teeth on an outer periphery thereof;
    a second gear having teeth on an outer periphery thereof configured to mesh with the teeth on the outer periphery of the first gear;
    a first lubricant receiver configured to catch lubricant from the first gear before an engagement portion where the first gear and the second gear mesh;
    a second lubricant receiver configured to catch lubricant from the first gear after the engagement portion; and
    a third lubricant receiver configured to catch lubricant from the second gear,
    wherein a minimum distance between the second lubricant receiver and the first gear is less than a distance between the first lubricant receiver and the first gear at every position of the first lubricant receiver so that lubricant at the second receiver is applied to the first gear, and
    wherein a minimum distance between the second gear and the third lubricant receiver is substantially the same as the minimum distance between the second lubricant receiver and the first gear.

2. The gear train assembly according to claim 1, wherein a portion of the second lubricant receiver is formed substantially in the shape of an arc of a circle between a predetermined angle, the arc of the circle being substantially concentric with the first gear.

3. The gear train assembly according to claim 1, wherein the first lubricant receiver and the second lubricant receiver are provided substantially vertically below the first gear.

4. The gear train assembly according to claim 1, wherein the third lubricant receiver is provided substantially vertically below the second gear.

5. The gear train assembly according to claim 1, wherein a portion of the third lubricant receiver is formed substantially in the shape of an arc of a circle drawn between a predetermined angle, the arc of the circle being substantially concentric with the second gear.

6. The gear train assembly according to claim 1, wherein the first gear and the second gear are helical gears.

7. The gear train assembly according to claim 1, wherein a portion of the first lubricant receiver is formed substantially in the shape of an arc drawn between a predetermined angle, the arc being substantially concentric with the first gear.

8. An image forming apparatus for forming an image, comprising:
    an image bearing member configured to bear an electrostatic latent image on a surface thereof;
    a developing device configured to develop the electrostatic latent image formed on the image bearing member using toner to form a toner image;
    a transfer device configured to transfer the toner image onto a recording medium;
    a fixing device configured to fix the toner image on the recording medium; and
    a gear train assembly including
        a first gear having teeth on an outer periphery thereof;

a second gear having teeth on an outer periphery thereof configured to mesh with the teeth on the outer periphery of the first gear;

a first lubricant receiver configured to catch lubricant from the first gear before an engagement portion at which the first gear and the second gear mesh;

a second lubricant receiver configured to catch lubricant from the first gear after the engagement portion; and a third lubricant receiver configured to catch lubricant from the second gear, wherein a minimum distance between the second lubricant receiver and the first gear is less than a distance between the first lubricant receiver and the first gear at every position of the first lubricant receiver so that lubricant at the second receiver is applied to the first gear, and wherein a minimum distance between the second gear and the third lubricant receiver is substantially the same as the minimum distance between the second lubricant receiver and the first gear.

* * * * *